Patented Feb. 20, 1940

2,191,056

UNITED STATES PATENT OFFICE 2,191,056

MANUFACTURE OF ARTIFICIAL MATERIALS

Georg Wick, Bitterfeld, Germany, assignor to I. G. Farbenindustrie Aktiengesellschaft, Frankfort-on-the-Main, Germany No Drawing. Application July 25, 1936, Serial No. 92,699. In Germany July 26, 1935

3 Claims. (Cl. 260—36)

Polymerisates of vinylchloride known as polyvinyl chloride, prepared as hitherto by the application of pressure and heat, have been brittle products. It has therefore been proposed to add softening agents to the polyvinyl chloride, either before or after moulding it. Although, however, these softening agents improve the moulding properties of the product, a satisfactory homogeneity is not obtained, the brittleness being very little improved.

This invention is based on the discovery that if certain softening agents are added to the polyvinyl chloride at certain well-defined high temperatures a transformation suddenly occurs, the mixture becoming homogeneous. While, for example, a mixture of 100 parts of polyvinyl chloride and 50 parts of tricresyl phosphate cannot be made into a homogeneous mass at 105° C. and 110° C. even with prolonged kneading, yet at 115° C. a sudden change in the behavior of the mixture is observed, which can be attributed to the setting-in of homogeneity. Once produced, the homogeneity persists when the temperature is lowered even below 0° C. In this manner it is possible to produce from polyvinyl chloride and a softening agent a fully homogeneous product free from brittleness.

The incorporation of softening agents with cellulose esters for making plastic masses has long been known. The usual method whereby the mixture is merely kneaded does not, however, give the desired results with polyvinyl chloride, since the latter is practically insoluble in the softening agents under the conditions usual in the manufacture of the cellulose products. The union of the polyvinyl chloride and the softening agent into a homogeneous mass occurs, as I have discovered, under pressure and at temperatures which have hitherto been supposed to approach very nearly the temperature at which polyvinyl chloride decomposes.

The conditions under which the polyvinyl chloride gelatinizes when heated with a softening agent depend to a certain extent on the kind and proportion of the softening agent and of the degree of polymerization of the polyvinyl chloride. In calendering a mixture of 20 per cent. of a softening agent and a medium polymerisate of polyvinyl chloride a temperature of 130° to 150° C. is used, while with 50 per cent. of a softening agent, 110° to 120° C. is used. As softening agents, all the known substances used for cellulose derivatives and other known artificial materials may be used. The esters of phosphoric acid, phthalic acid, benzoic acid, adipic acid and the like are preferable. The softening agent most suitable in producing a mass intended for any particular application must be ascertained by a preliminary experiment. The softening agent and the polyvinyl chloride may be mixed in a heated kneader, on rolls, under a press or any other suitable apparatus, while heating to the temperature at which gelatinization begins. The mass may be mixed with filling materials and dyes as may be.

The following are some of the properties of the masses prepared by this invention: almost complete indifference to water and many aqueous solutions; good electrically insulating properties; good indifference to temperature; permanence.

These masses may be used for sheathing and insulating conductors of electricity; as a substitute for rubber, Celluloid, artificial leather and oilcloth; in the form of films and sheets, for wrapping, coating or the like.

The invention is illustrated by the following examples, in which the parts are by weight:

Example 1.—100 parts of powdered polyvinyl chloride are mixed with 50 parts of tricresylphosphate on a heated calender. When 115° C. is attained the mass suddenly begins to gelatinize. The rolling is continued until the rolls are coated with a perfectly homogeneous glass-clear skin. The product is a tough rubbery mass which remains plastic even at temperatures somewhat below 0° C.

Example 2.—100 parts of polyvinyl chloride are worked with 30 parts of tricresyl-phosphate on a calender heated to 130° C. until a homogeneous sheet is produced. The product suffers no appreciable change of weight even if left for days in water or mineral oil.

What I claim is:

1. The process for manufacturing artificial materials from an insoluble polyvinylchloride and tricresylphosphate, which comprises working together the said materials on a calender at a temperature of 115 to 130° C. until a gelatinized homogeneous sheet is produced.

2. The process for manufacturing artificial materials from an insoluble polyvinylchloride and tricresylphosphate, which comprises mixing 100 parts of powdered polyvinyl chloride with 50 parts of tricresylphosphate on a calender heated to 115° C. until a homogeneous skin is formed.

3. The process for manufacturing artificial materials from an insoluble polyvinyl chloride and a softening agent, which comprises working together the said material under pressure at a temperature between 110 and 150° C. at which the mass gelatinizes, maintaining said temperature and continuing said working at said temperature until the mass becomes homogeneous.

GEORG WICK.